United States Patent
Akhteruzzaman

(10) Patent No.: US 7,295,661 B2
(45) Date of Patent: Nov. 13, 2007

(54) ENHANCED TELECOMMUNICATIONS ALERTING

(75) Inventor: Akhtar Akhteruzzaman, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 745 days.

(21) Appl. No.: 10/695,308

(22) Filed: Oct. 28, 2003

(65) Prior Publication Data

US 2005/0089154 A1 Apr. 28, 2005

(51) Int. Cl.
*H04M 3/42* (2006.01)
*H04M 3/46* (2006.01)
*H04M 3/54* (2006.01)
*H04M 3/56* (2006.01)

(52) U.S. Cl. .................... 379/201.02; 379/205.01; 379/207.02; 379/211.03; 379/211.04

(58) Field of Classification Search ..............
379/201.01–201.05, 211.02–211.04, 205.01, 379/207.02, 211.01
See application file for complete search history.

(56) References Cited

U.S. PATENT DOCUMENTS

| 5,206,901 A | | 4/1993 | Harlow et al. ............... 379/211 |
| 5,329,578 A | * | 7/1994 | Brennan et al. ........ 379/211.03 |
| 5,631,904 A | * | 5/1997 | Fitser et al. ................. 370/261 |
| 6,714,636 B1 | * | 3/2004 | Baiyor et al. ........... 379/211.04 |
| 6,760,423 B1 | * | 7/2004 | Todd ...................... 379/202.01 |
| 6,771,761 B1 | * | 8/2004 | LaPierre ................ 379/211.02 |
| 6,917,673 B2 | * | 7/2005 | Sawada et al. ........ 379/201.02 |

* cited by examiner

Primary Examiner—Harry S. Hong

(57) ABSTRACT

A method and apparatus for providing a calling customer with arrangements for enhanced alerting of called numbers. A customer defines an alerting list which is entered by the telephone company and can be modified by the customer. When the customer dials a special number, the telephone stations associated with the telephone numbers on that customer's enhanced alerting list are alerted either in parallel (as in flexible alerting) or sequentially under the control of the caller. Advantageously, a customer can arrange to alert a predefined group of called numbers in response to dialing a special number.

14 Claims, 3 Drawing Sheets

ENHANCED TELECOMMUNICATIONS ALERTING

TECHNICAL FIELD

This invention relates to a method and apparatus for alerting (ringing) called customers in telecommunications systems.

BACKGROUND OF THE INVENTION

Alerting is the process, usually by mean of a ringing signal, of informing a called customer that a call for that customer has been received in a switch for serving the called customer. In the simplest call, a single called customer is provided with an alerting signal. A recent innovation in alerting is a system for flexible alerting, as described in Harlow et al.: U.S. Pat. No. 5,206,901, wherein a group of telecommunications stations are simultaneously alerted and the call is established to the station that first answers. For example, the owner of a business who does not want to miss any calls may request that all of that owner's telephones be alerted at the business location, at a cell phone and at a home location. In response to receipt of a special telephone number, the switch which receives the incoming call consults its records and finds the telephone numbers of these three locations and establishes a connection to all three of these locations. When one of the telecommunications stations answers the call connections to the other stations are dropped.

SUMMARY OF THE INVENTION

Applicant has carefully analyzed the advantages and failings of flexible alerting and has recognized inventively that while the called party can specify the flexible alerting arrangement, there is no equivalent of flexible alerting for callers. A flexible alerting arrangement for callers can be useful for cases in which a caller has special information, e.g., an unlisted number of one of the destinations, for a flexible alerting list that is not provided by the called party.

In accordance with Applicant's invention, a calling party provides to a switch serving that calling party a list of called numbers corresponding to a special number assigned to the caller. When the caller dials this special number all telephone numbers on that list are alerted. The alerting takes place in one of two arrangements: in accordance with a first arrangement all the numbers are alerted simultaneously and the call is completed to the first station that answers. In accordance with another feature of Applicant's invention, the various stations on the list are alerted sequentially either following a pre-assigned number of rings or with an arrangement wherein a connection is set up to successive telephone numbers on that list in response to receipt of a signal such as a flash or a special dialed code. Advantageously, the caller can control the alerting, either in parallel or sequentially, of a group of telephone numbers without requiring that a called party has established such a list. For example, a special customer demanding immediate and continual access to the owner of a business may establish a list similar to the one described for flexible alerting in order to control access to the owner of the business.

As an example of the use of this facility, a business owner may have three numbers on a flexible alerting list the number of the office, the number of the cell phone, and the number of his home. In the case of a special client, the special client may have his own enhanced alerting list which would include those three numbers plus the number of the business owner's vacation house so that the special client can reach the owner even at the owner's vacation house (which may have an unlisted number).

In accordance with one feature of this invention, one of the numbers may be that of a pager; this is especially useful if the called party wishes to restrict use of the pager for only special purposes. For this case, the system must provide both the number of the paging service and the called party's identification number, as well as the means for dialing the paging service and then, after an appropriate pause, providing the identification number.

BRIEF DESCRIPTION OF THE DRAWING(S)

DETAILED DESCRIPTION

Figure 1:
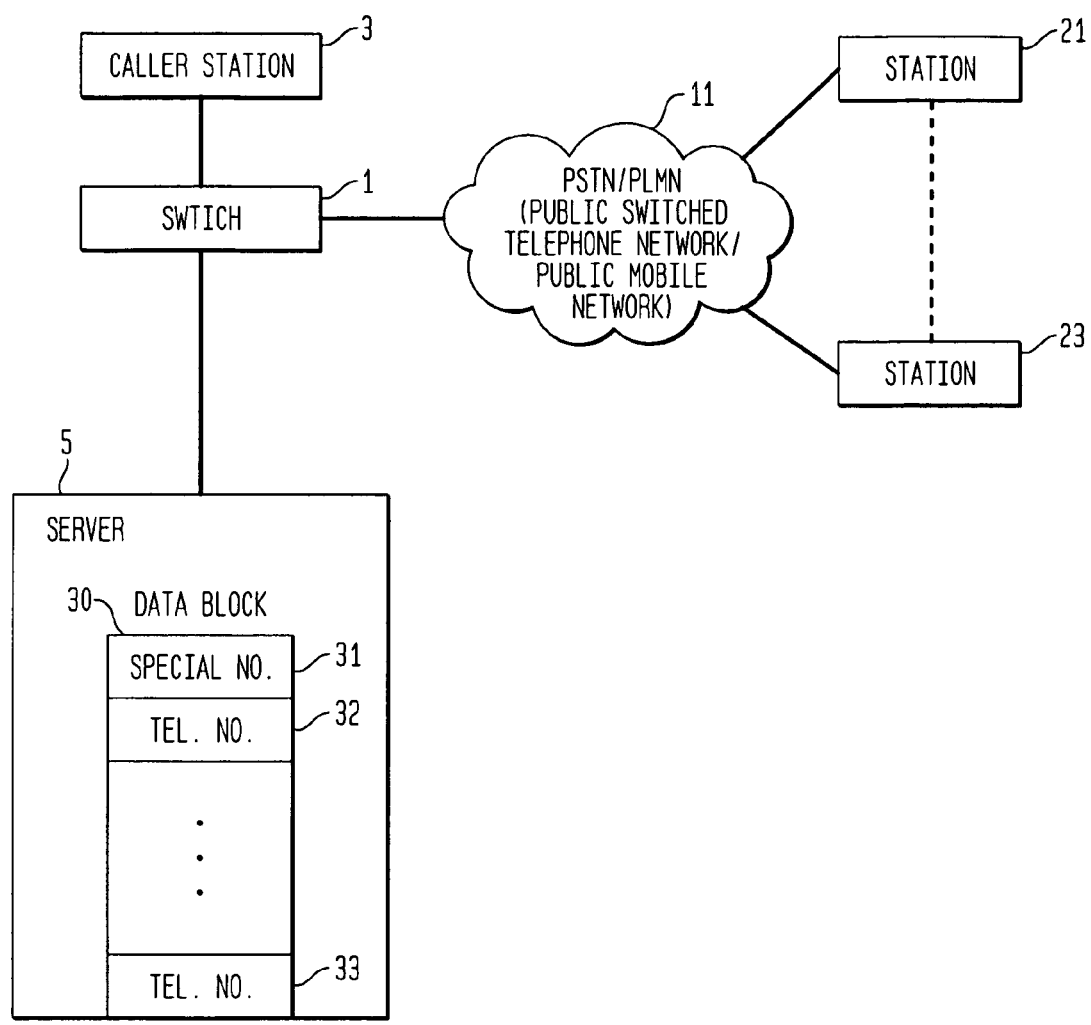
FIG. 1 is a block diagram illustrating the apparatus of Applicant's invention.

FIG. 1 is a block diagram illustrating the apparatus of Applicant's invention. A caller station 3 is connected to a switch. When the caller dials a special number 30, the switch accesses server system 5 to find the telephone numbers of the caller's enhanced alerting list. These numbers are stored in a table 30 associated with special number 31; the table has entries 32, . . . , 33, the telephone numbers of the caller's enhanced alerting list. When the caller dials the special number the switch makes connections through the public switched telephone network/public mobile network (PSTN/PLMN) to the various stations 21, . . . , 23 associated with the telephone numbers 32, . . . , 33.

Figure 2:
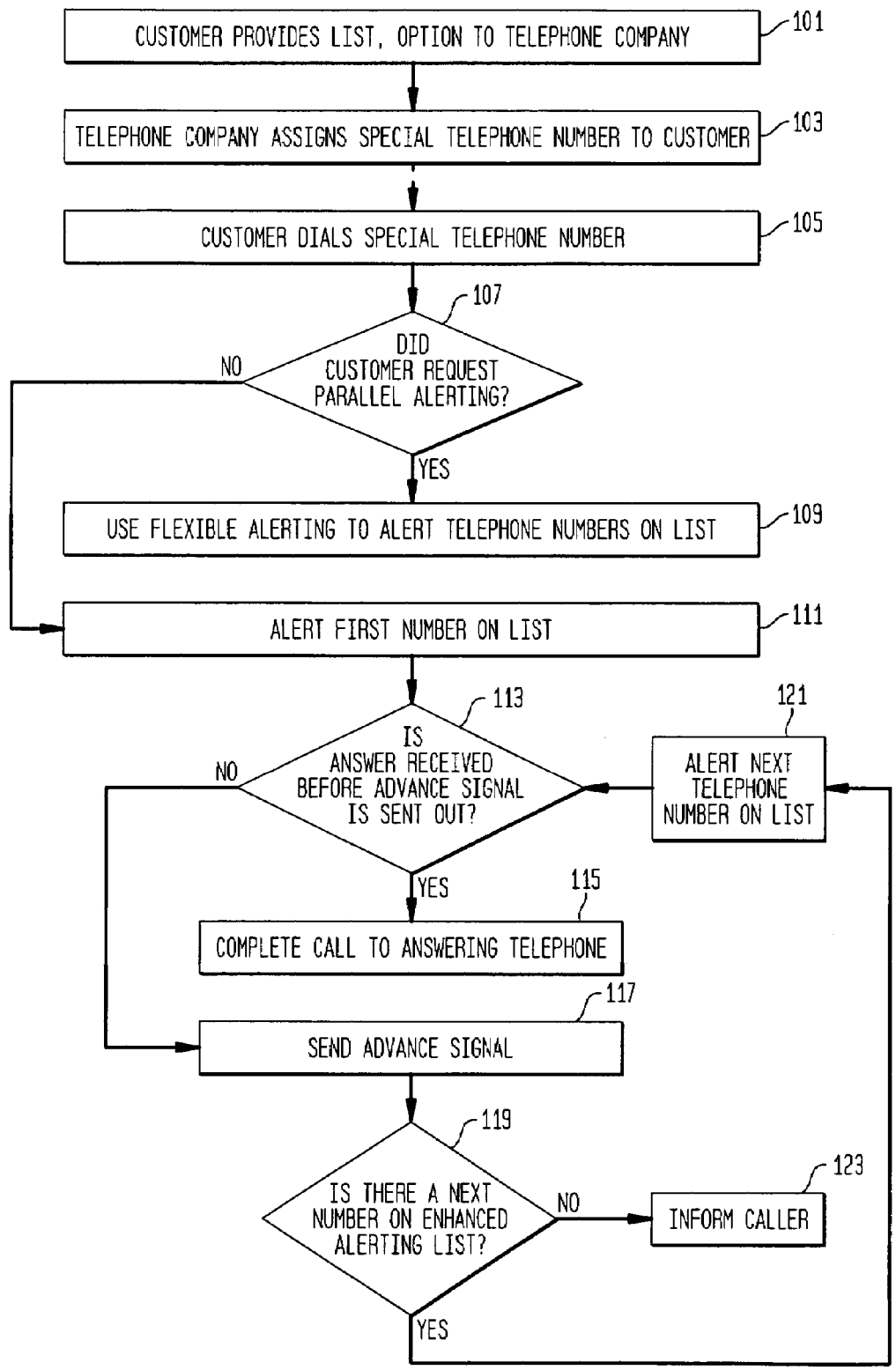
FIG. 2 is a flow diagram showing the operation of Applicant's invention.

FIG. 2 is a flow diagram illustrating the operation of Applicant's invention. A customer provides an enhanced alerting list and an option indication to the telephone company (action block 101). As a result, the telephone company builds a data block 30 in server 5. The telephone company assigns a special telephone number 31 to the customer (action block 103). At some later time the customer dials this special telephone number (action block 105). The switch makes a test to determine whether the customer requested parallel alerting (test 107). If the customer had requested parallel alerting then a flexible alerting connection is established to alert all of the telephone numbers on the customer's list in parallel (action block 109). If the customer did not request parallel alerting, then a connection is established to the telephone station of the first number on the list and that telephone station is alerted (action block 111). Test 113 then determines if an answer is received before an advance signal is sent by the customer. If an answer signal is received first, then the call is completed to the answering telephone (action block 115). If no answer is received before an advance signal is sent, then the customer sends an advance signal (action block 117). An advance signal is a signal to step to the next telephone station to be alerted. The advance signal may be a flash or it may be a dialed indication such as *5. If the switch receives an advance signal, test 119 is used to determine if there is a next number or a set of parallel next numbers on the customer's list. If there is a next number, then the next telephone number(s) on the list is (are) alerted (action block 121) and a connection is established to that (those) telephone(s). Then test 113 is entered. If there is no next number on the list then the caller is informed of this fact (action block 123), for example, by an announcement. This is an indication that the call to the special number cannot be completed.

Figure 3:
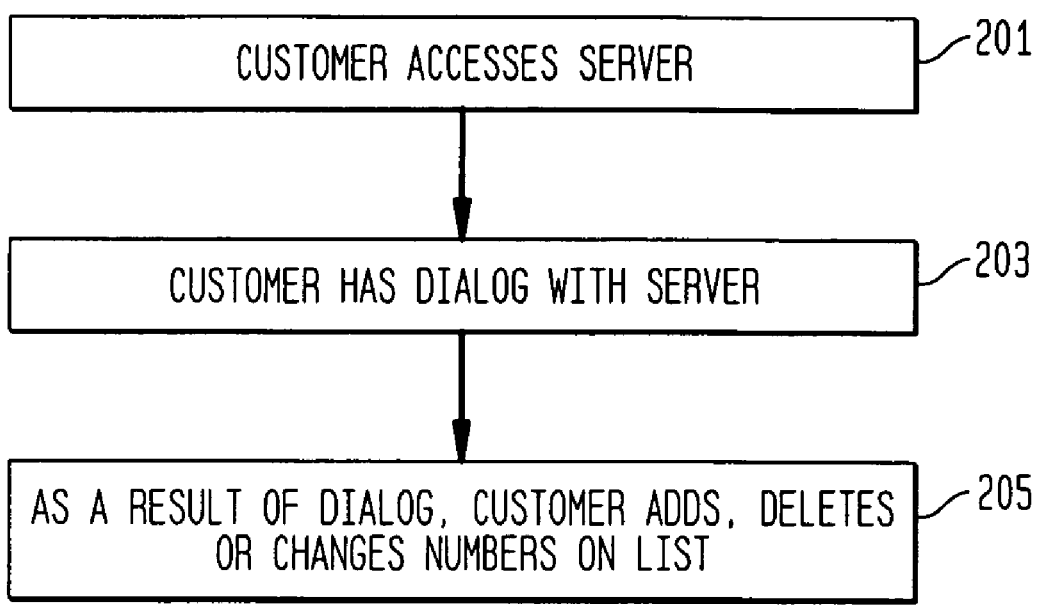
FIG. 3 is a flow diagram illustrating how the customer can alter the data of the enhanced alerting list.

FIG. 3 is a flow diagram illustrating that the customer can alter the contents of the table stored in the server. The customer accesses the server (action block 201). The customer then has a dialog with the server (action block 203), the dialog being the same type of dialog that is used in interacting with, for example, a bank information system. The customer then can add, delete, or change numbers on the list (action block 205).

While in the above description, the number to be alerted is that of a telecommunications station, it can also be a pager number so that the paging service is alerted along with other destinations.

The above description is of one preferred embodiment of Applicant's invention. Other embodiments will be apparent to those of ordinary skill in the art without departing from the scope of the invention. The invention is limited only by the attached claims.

I claim:

1. A method of alerting a called telephone station comprising the steps of:
   under the control of a specific calling customer, defining an enhanced alerting list and a telephone number for calling for said enhanced alerting list;
   responsive to said specific calling customer dialing said telephone number, alerting the telephones of the telephone numbers on said enhanced alerting list.

2. The method of claim 1 wherein the step of alerting the telephones of said telephone number on the said list comprises the step of alerting said telephones in parallel.

3. The method of claim 1 wherein the step of alerting said telephones comprises the step of alerting said telephones sequentially.

4. The method of claim 3 wherein the step of alerting said telephone sequentially comprises the step of advancing from one member of the group of telephones to the next member in response to receipt of a signal from said calling customer.

5. The method of claim 3 wherein the step of advancing sequentially comprises the step of advancing after a predetermined number of rings.

6. The method of claim 1 wherein said calling customer can alter said enhanced alerting list.

7. The method of claim 1 wherein one of the numbers on said enhanced alerting list is that of a paging service for paging a called customer.

8. Apparatus for alerting a called telephone station comprising:
   means, under the control of a specific calling customer, for defining an enhanced alerting list and a telephone number for calling for said enhanced alerting list;
   means, responsive to said customer dialing said telephone number, for alerting the telephones of the telephone numbers on said enhanced alerting list.

9. The apparatus of claim 8 wherein the means for alerting the telephones of said telephone number on the said list comprises means for alerting said telephones in parallel.

10. The apparatus of claim 8 wherein the means for alerting said telephones comprises means for alerting said telephones sequentially.

11. The apparatus of claim 10 wherein the means for alerting said telephone sequentially comprises means for advancing from one member of the group of telephones to the next member in response to receipt of a signal from said calling customer.

12. The apparatus of claim 10 wherein the means for advancing sequentially comprises means for advancing after a predetermined number of rings.

13. The apparatus of claim 8 further comprising means for permitting said calling customer to alter said enhanced alerting list.

14. The apparatus of claim 8 further comprising means for permitting one of the numbers on said enhanced alerting list to be that of a paging service for paging a called customer.

* * * * *